Jan. 9, 1934.  H. HEYSSLER  1,942,754
TIME INTERVAL INDICATOR
Filed Dec. 5, 1930   2 Sheets-Sheet 1
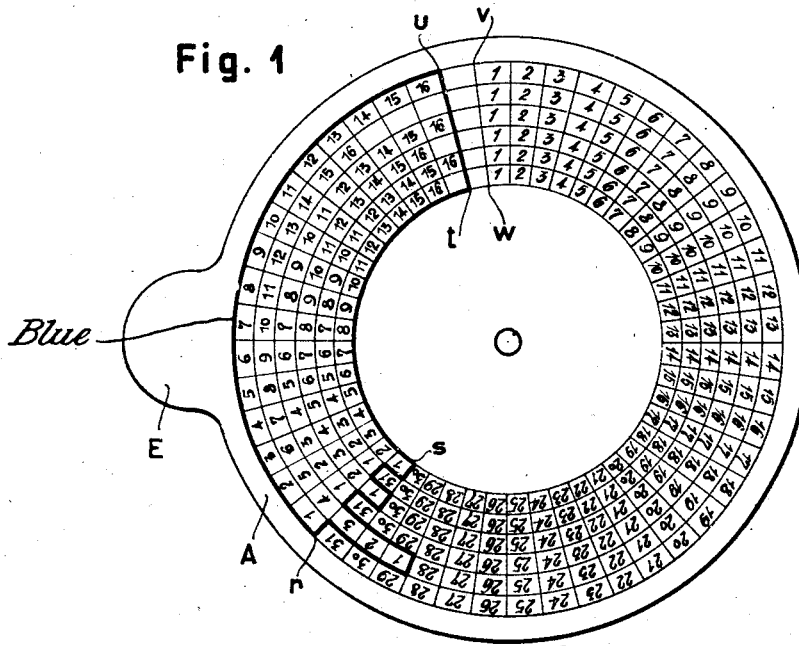
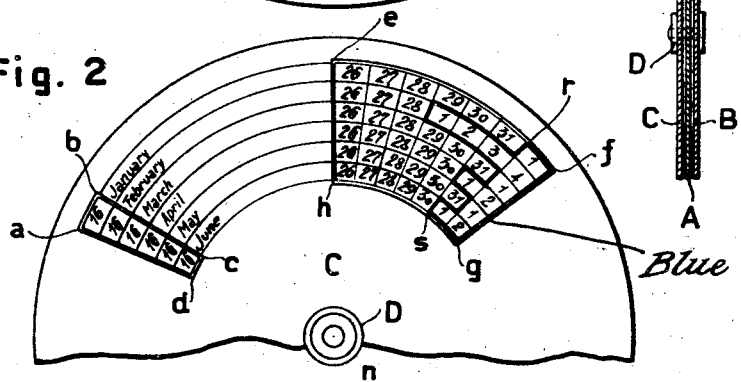
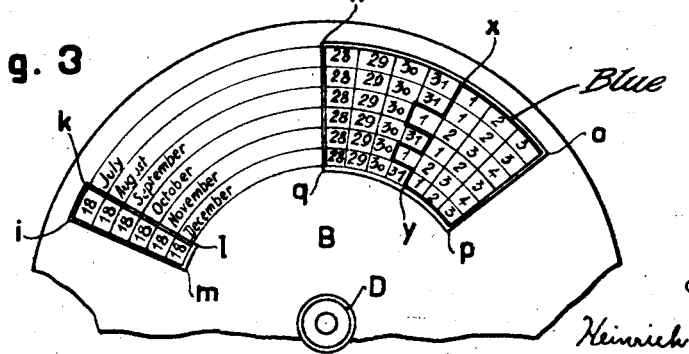

Jan. 9, 1934.                H. HEYSSLER                1,942,754
                          TIME INTERVAL INDICATOR
                      Filed Dec. 5, 1930        2 Sheets-Sheet 2

Patented Jan. 9, 1934                                                  1,942,754

UNITED STATES PATENT OFFICE 1,942,754

TIME INTERVAL INDICATOR

Heinrich Heyssler, Stubing, Austria

Application December 5, 1930, Serial No. 500,411, and in Austria February 1, 1930

11 Claims. (Cl. 40—115)

This invention relates to a time interval indicator which is simple in construction and is easily manipulated for rapidly determining time intervals, in order particularly in the case of women having regular four-weekly menstrual periods, to determine in a convenient and reliable manner the period of time after a menstruation in which, according to present knowledge, a female is liable to conception and at the same time determine the duration of the inter-menstrual period during which there is no capacity for conception. These determinations are of particular importance for women of weak health for whom an undesired conception would often entail danger to health.

Two forms of the invention are illustrated in the accompanying drawings as examples, and in which:—

Figure 1 illustrates one disc element of an indicator upon which the days of the months for the first six months of the year are arranged in concentric circles upon one side of the element, Figure 2 illustrates a portion of an indicator employing the element illustrated in Figure 1 and shows the indicator in a position in which liability to conception is indicated, calculated from a day within the first half of a year, Figure 3 is a view similar to Figure 2 of the opposite side of the indicator showing a calculation for the second half of the year, Figure 4 shows a central section through the indicator which consists of three superposed discs, and Figures 5 and 6 illustrate a modified construction of indicator in which Figure 5 illustrates one element of the indicator showing the days of the months in a lineal arrangement, whilst Figure 6 illustrates the indicator adjusted for a particular date to indicate liability to conception.

The elements of the two forms of indicator illustrated may be adjusted in each case relatively to one another to determine the period of physiological sterility of a woman in the first ten days of a menstrual period and also the period from the eighteenth day of the menstrual period. Further, the conception or fruitful period commencing with the eleventh day of the menstrual period and ending with the seventeenth day inclusive thereof may be determined.

Referring to Figures 1 to 4, the indicator consists of three circular discs A, B, C, which are rotatably connected together by means of a pivot pin D (Figures 2 and 3) extending through the central points of the discs. The middle disc A is provided with a lug E for manipulation purposes and is provided upon each side with the numbers indicating the consecutive days of the months in six concentrically arranged circles at $v$, $w$, and following upon the days of each month the succeeding sixteen days are indicated in the said circles. This second group of days for the first six months, January to June in Figure 1, is located between the thicker lines $r$, $s$, and $u$, $t$, whereas for the months of July to December the relative arrangement of the second group of sixteen days to the previous days of the month is shown upon the opposite side of the disc A by the irregular, thicker line $x$, $y$, Figure 3. The sixteen day periods may be distinguished from the first full set of days of the months, by being suitably coloured on the disc A, for example, by the colour blue, while the full set of days of the month may be provided upon a white ground. For the sake of easier production, the disc A is divided into forty-eight radial divisions, the division $u$, $t$, $v$, $w$ located between the commencement and the end of the indications, remaining blank.

Figure 2 shows an example for determining the period of liability to conception for a menstrual period commencing on the sixteenth day of any of the months January to June. A rotatable disc C is provided with two different sector shaped openings, of which the narrower opening $a$, $b$, $c$, $d$, is arranged to disclose the indications of radially disposed similar days of the months for any adjustment of the disc C, while the ten-day duration of the physiological sterility commencing with the menstrual period is located between the edges $a$, $d$ and $e$, $h$, respectively of the two openings and by means of the larger sector shaped opening $e$, $f$, $g$, $h$ the period from the eleventh to the seventeenth days, inclusive, the corresponding conception period is indicated. The sector shaped openings in the two outer discs B, C may be provided with transparent materials or may be provided in any other suitable manner as for example by constructing the openings in the form of frames or the like, pivotally mounted at D to the disc A.

Figure 3 illustrates an example of calculation for the months of the second half of the year, and in which the eighteenth day of the month is taken as the commencement of the menstrual period. The two sector shaped openings are, in this case, provided in the disc B, and are indicated at $i$, $k$, $l$, $m$ and $n$, $o$, $p$, $q$.

The figures which appear in the sectors $e$, $f$, $g$, $h$ or $n$, $o$, $p$, $q$ upon the right of the irregular lines $r$, $s$, and $x$, $y$, (Figures 2 and 3) or in the coloured portions of the disc A, indicate the days of the month following that to a date in which the indicator is adjusted, whereas the figures upon the left of the irregular lines (Figures 2 and 3) indicate the days of the month in which a menstrual period commences for which calculations are to be made. When a calculation is made in respect of a day in about the first half of a month, with the exception of the month of February, the figures located upon the right of the irregular lines (Figures 2 and 3), that is to say, the days for the following month, will not appear. The days indicated on the right of the irregular lines (Figures 2 and 3) must not, of course, be adjusted beneath the narrower openings of the two discs B and C when a calculation is to be made, but only the required date of the complete set of days of the months, that is, for example, that on white ground.

Referring to Figures 5 and 6, a rectangular form of indicator is illustrated in which a slide F is displaceable in a hollow cover G provided with rectangular openings $a^1$, $b^1$, $c^1$, $d^1$ and $e^1$, $f^1$, $g^1$, $h^1$, corresponding respectively to the openings $a$, $b$, $c$, $d$ and $e$, $f$, $g$, $h$ in the indicator above described, and the days of the months are indicated for the twelve months of the year on one side of the slide. In Figure 6 the indicator is adjusted to the seventeenth day of a month for determining the period of liability to conception, the days falling in the month following being indicated upon the right of the irregular lines $r^1$, $s^1$.

The indicators may be constructed from any desired materials, and may be provided with stop devices of any convenient form for maintaining the rotatable discs in a selected position relatively to one another for a relatively long time after a menstrual period is determined, so that errors may be avoided.

It is to be understood that the rectangular form of indicator may be modified so that the slide F is in the form of a cylinder, the indication openings being formed in an outer cylinder arranged concentrically around the first cylinder so as to be adjustable relatively thereto.

What I claim is:—

1. A device for indicating substantially the conceptive periods of females which comprises in combination a disc provided with sets of indications upon one side thereof, said sets of indications comprising successive numerals representing the days of a month followed by successive numerals representing an initial number of the days of the following month, a member adjustable relatively to said disc provided with successively spaced indicating means operable to indicate any selected day corresponding to the date of beginning of a menstrual period, a second indicating means arranged to indicate a plurality of days corresponding to the conceptive period within the said menstrual period, the space between the said indicating means corresponding to the first period of physiological sterility within the said menstrual period.

2. A device for indicating substantially the conceptive periods of females which comprises in combination two co-axially arranged juxtaposed discs adjustable relative to one another, one of which is provided with sets of indications comprising successive numerals of the days of a month in one colour, followed by successive numerals of an initial portion of the days of the following month in another colour and the other disc of which comprises successively spaced indication means adjustable to indicate any selected day corresponding to the date of the beginning of a menstrual period and a second indication means arranged to indicate a plurality of days corresponding to the conceptive period within the said menstrual period, the space between the said indicating means corresponding to the first period of physiological sterility within the said menstrual period.

3. A device for indicating substantially the conceptive periods of females which comprises in combination two co-axially arranged, juxtaposed discs adjustable relatively to one another, one of which is provided with a plurality of concentrically disposed sets of indications, each set comprising successive numerals representing the days of a month followed by successive numerals representing an initial number of the days of the following month, corresponding numerals of the first successive series of each set of indications being aligned radially of the disc and the other disc of which is provided with an aperture arranged to disclose any selected day of the said first successive days and a second aperture arranged to disclose automatically the conceptive period corresponding to a menstrual period commencing upon the day disclosed by the first said aperture.

4. A device for indicating substantially the conceptive periods of females which comprises in combination a disc provided with sets of indications upon one side thereof, said set of indications comprising successive numerals representing the days of a month followed by successive numerals representing an initial number of the days of the following month, corresponding numerals of the first successive series of each set of indications being aligned radially of the disc, a member adjustable relatively to said disc provided with indicating means operable to indicate any selected day of the first said successive days, a second indicating means arranged to indicate automatically the conceptive period corresponding to the menstrual period commencing upon the day indicated by the first said means.

5. A device for indicating substantially the conceptive periods of females which comprises in combination a slide provided with a plurality of sets of aligned indications upon one side thereof, each set of indications comprising successive numerals representing the days of a month followed by successive numerals representing an initial number of the days of the following month, a member adjustable relatively to said slide provided with successively spaced indicating means operable to indicate any selected day corresponding to the date of beginning of a menstrual period, a second indicating means arranged to indicate a plurality of days corresponding to the conceptive period within the said menstrual period, the space between the said indicating means corresponding to the first period of physiological sterility within the said menstrual period.

6. A device for indicating substantially the conceptive periods of females which comprises in combination a slide provided with a plurality of sets of aligned indications, each set of indications comprising successive numerals representing the days of a month followed by successive numerals representing an initial number of the days of the following month, a member surrounding said slide and adjustable relatively thereto in a direction corresponding to the alignment of the indications, one aperture in said member arranged to expose any selected day corresponding to the date of beginning of a menstrual period and another aperture in said member arranged to expose a plurality of days corresponding to the conceptive period within the said menstrual period, the space between the said two apertures corresponding to the first period of physiological sterility within the said menstrual period.

7. A device for indicating the conceptive period of females which comprises in combination a plurality of elements adjustable relatively to one another, one of said elements provided with sets of indications, each of said sets comprising successive numerals of the days of a month followed by successive numerals corresponding to an initial portion of the days of the following month, and the other element comprising two successively spaced indicating means, one of which is adapted to indicate any selected day corresponding to the date of beginning of the menstrual period and the second indicating means arranged to indicate a plurality of days corresponding to the conceptive period within the said menstrual period, the space between the said indicating means corresponding to the first period of physiological sterility within the said menstrual period.

8. A device for indicating the conceptive period of females which comprises in combination a plurality of elements adjustable relatively to one another, one of said elements provided with sets of indications, each of said sets comprising successive numerals in one colour of the days of a month followed by successive numerals of an initial portion of the days of the following month in another colour, and the other element comprising two successively spaced indicating means, one of which is adapted to indicate any selected day corresponding to the date of beginning of the menstrual period and the second indicating means arranged to indicate a plurality of days corresponding to the conceptive period within the said menstrual period, the space between the said indicating means corresponding to the first period of physiological sterility within the said menstrual period.

9. A device for indicating the conceptive period of females which comprises in combination a plurality of elements adjustable relatively to one another, one of said elements provided with sets of indications, each of said sets comprising successive numerals of the days of a month followed by successive numerals corresponding to an initial portion of the days of the following month, and the other element comprising two successively spaced apertures, one of said apertures being adapted to expose any selected day corresponding to the date of beginning of the menstrual period and the second aperture arranged to expose a plurality of days corresponding to the conceptive period within the said menstrual period, the space between the said apertures corresponding to the first period of physiological sterility within the said menstrual period.

10. A device for indicating the conceptive period of females which comprises in combination two co-axially arranged juxtaposed discs adjustable relatively to one another, one of which is provided with sets of numerals corresponding to the days of a month followed by successive numerals corresponding to an initial portion of the days of the following month and the other disc comprising successively spaced indicating means, one of which is adapted to indicate any selected day corresponding to the date of beginning of a menstrual period, and the second indicating means arranged to indicate a plurality of days corresponding to the conceptive period within the said menstrual period, the space between the said indicating means corresponding to the first period of physiological sterility within the said menstrual period.

11. A device for indicating the conceptive period of females which comprises in combination two co-axially arranged juxtaposed discs adjustable relatively to one another, one of which is provided with sets of numerals corresponding to the days of a month followed by successive numerals corresponding to an initial portion of the days of the following month, and the other disc being provided with an aperture adapted to expose any selected day corresponding to the date of beginning of a menstrual period and a second aperture spaced apart from the said first aperture and arranged to expose a plurality of days corresponding to the conceptive period within the said menstrual period, the space between the said apertures corresponding to the first period of physiological sterility within the said menstrual period.

HEINRICH HEYSSLER.